United States Patent [19]

Hunt

[11] Patent Number: 4,741,943

[45] Date of Patent: May 3, 1988

[54] AERODYNAMIC STRUCTURES OF COMPOSITE CONSTRUCTION

[75] Inventor: James Hunt, King County, Wash.

[73] Assignee: The Boeing Company, Seattle, Wash.

[21] Appl. No.: 814,383

[22] Filed: Dec. 30, 1985

[51] Int. Cl.⁴ .................. B32B 5/12; B32B 31/00; B64C 1/00; B65C 3/26

[52] U.S. Cl. .................. 428/113; 244/123; 156/156; 156/249

[58] Field of Search .............. 244/123; 156/156, 249, 156/257; 428/109, 36, 113

[56] References Cited

U.S. PATENT DOCUMENTS

| | | |
|---|---|---|
| 3,645,833 | 2/1972 | Figge .................. 161/57 |
| 3,713,753 | 1/1973 | Brunsch . |
| 3,768,760 | 10/1973 | Jensen .................. 244/123 |
| 3,883,267 | 5/1975 | Baudier . |
| 3,902,944 | 9/1975 | Ashton et al. .................. 156/156 |
| 3,946,127 | 3/1976 | Eisenmann . |
| 3,959,544 | 5/1976 | Rogers . |
| 4,020,202 | 4/1977 | Kreft . |
| 4,020,205 | 4/1977 | Haselbauer .................. 428/116 |
| 4,022,547 | 5/1977 | Stanley . |
| 4,051,289 | 9/1977 | Adamson . |
| 4,079,903 | 3/1978 | Ashton et al. .................. 244/123 |
| 4,198,018 | 4/1980 | Brault . |
| 4,232,844 | 11/1980 | Sobey .................. 244/123 |
| 4,310,132 | 1/1982 | Robinson et al. .................. 244/119 |
| 4,400,421 | 8/1983 | Stover . |
| 4,469,730 | 9/1984 | Burhans .................. 428/36 |
| 4,557,783 | 12/1985 | Grone et al. .................. 156/257 |

Primary Examiner—John E. Kittle
Assistant Examiner—Patrick J. Ryan
Attorney, Agent, or Firm—Hughes & Cassidy

[57] ABSTRACT

Aerodynamic structures in which loads are carried around the corner between two angularly related sections in a covering composed of multiple, anisotropic plies of a polymer reinforced with unidirectional fibers or filaments (these terms are used interchangeably herein). Tear straps are incorporated in the covering to halt the propagation of cracks, and filler plies are located between the tear straps to minimize irregularities in the surfaces of the covering.

18 Claims, 5 Drawing Sheets

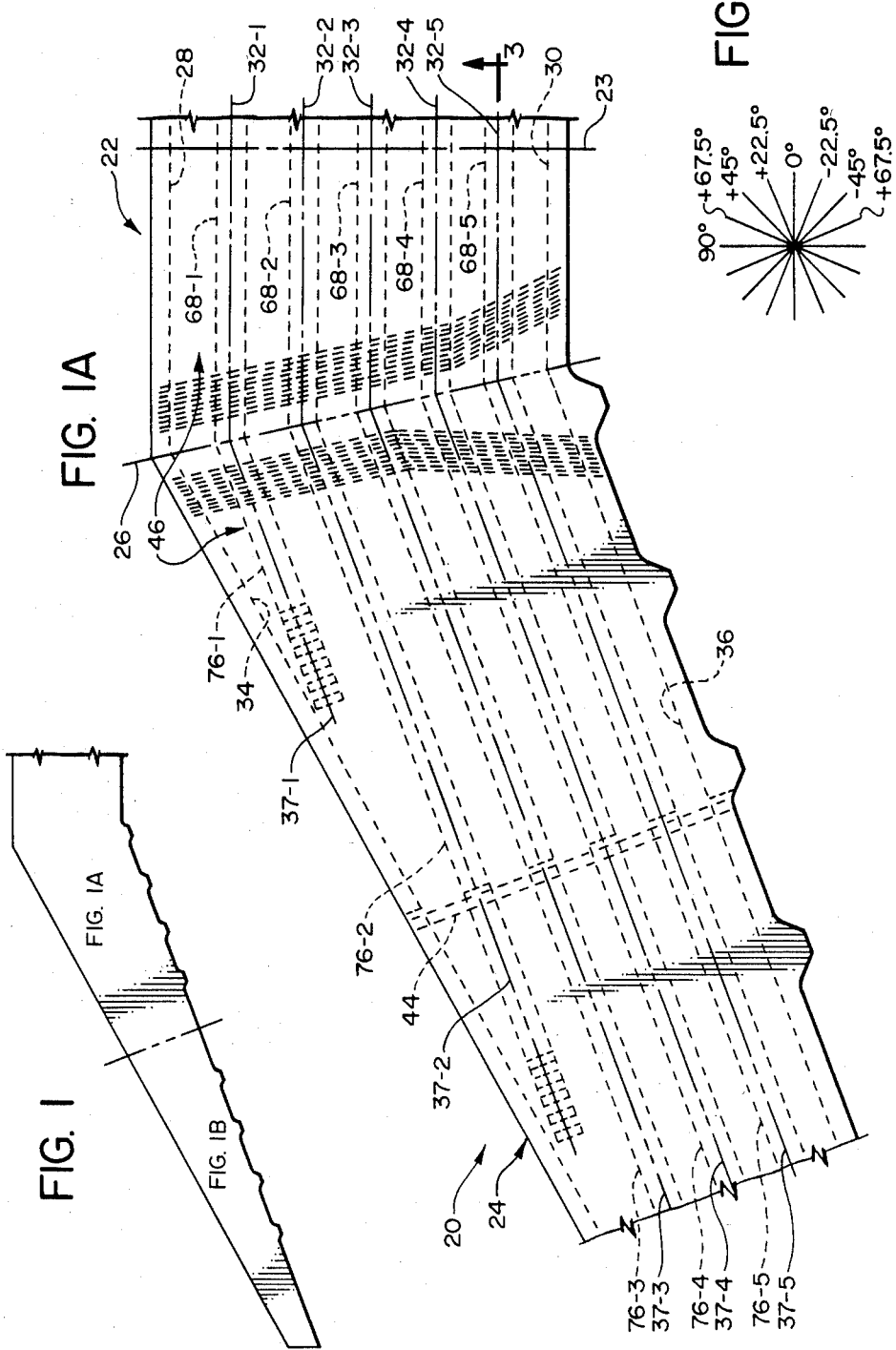
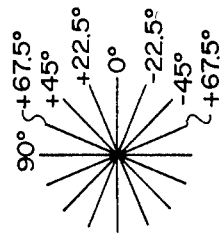

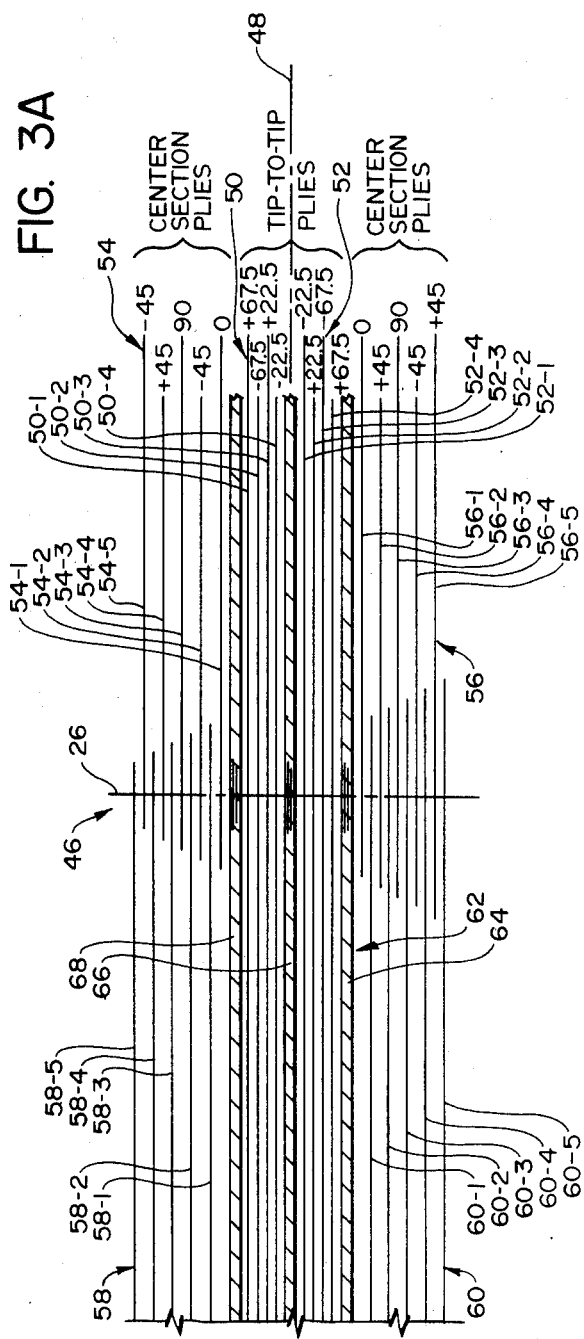

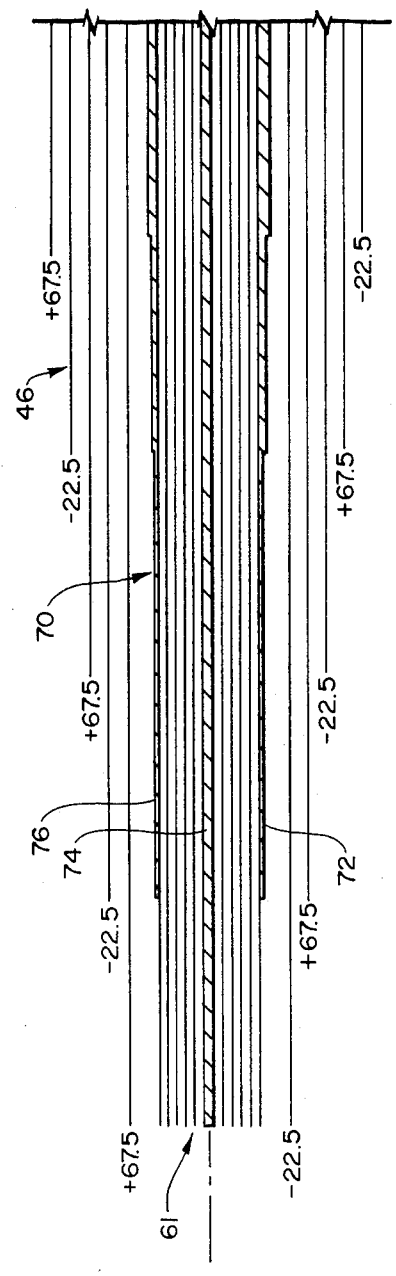

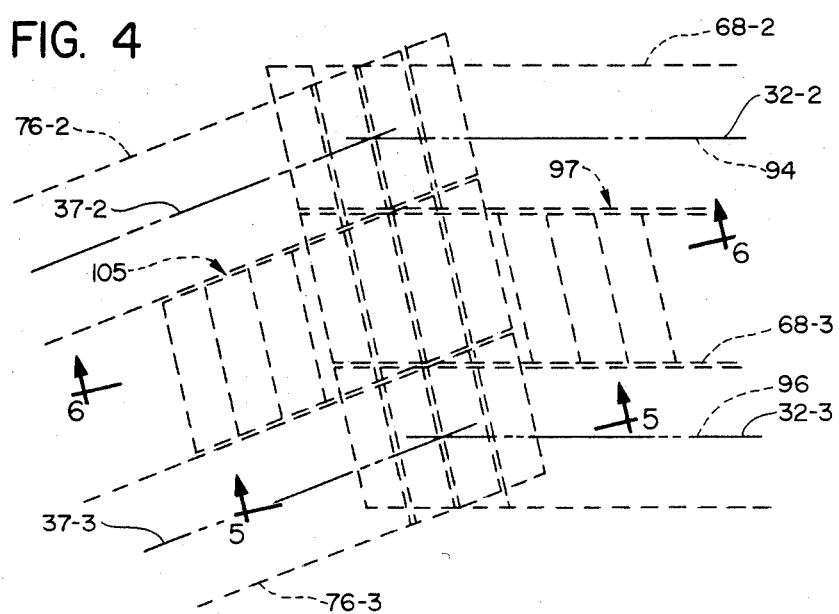
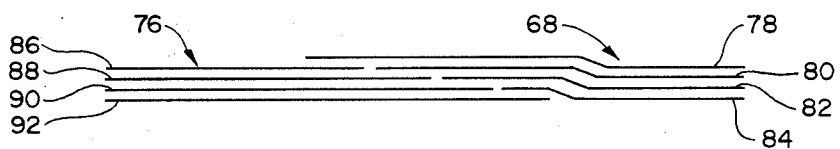
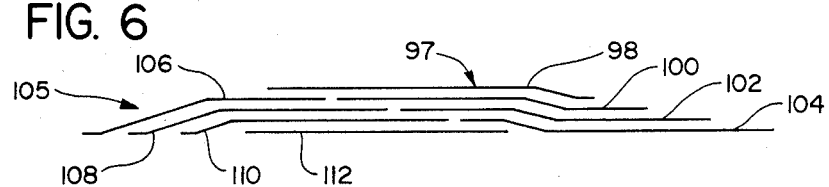

AERODYNAMIC STRUCTURES OF COMPOSITE CONSTRUCTION

TECHNICAL FIELD OF THE INVENTION

The present invention relates to aerodynamic structures of composite construction and, in its more specific aspects, to novel, improved structures such as wings and horizontal stabilizers which are of composite construction and have a center section and outboard sections which are integrated with and extend at an angle from the center section.

In the text which follows, reference will from time-to-time be made to the "zero axis" of the structure being described. In the design protocols of applicant's assignee, this is an axis parallel to the rear spar of the structure under consideration. While this is typically not the true zero axis, it closely approximates the latter and has the advantage that construction of the structure is considerably simplified by using it.

Also, reference will on occasion be made below to the juncture between the center and outboard sections of the aerodynamic structure being described. This is done simply for the sake of convenience and clarity and is not intended to limit the scope of my invention which is, in general, applicable to any aerodynamic structure having two angularly inclined, adjoining sections.

Also, reference will be made below to the orientation of the plies in the coverings of the novel composite aerodynamic structures disclosed herein. By such references are meant the orientations of the reinforcing fibers or filaments in those plies.

BACKGROUND OF THE INVENTION

Aerodynamic structures such as wings and horizontal stabilizers of the so-called swept-back type are frequently found in modern, high speed, jet aircraft. In the more advanced aircraft of this type, aerodynamic structures such as those just identified may be fabricated, at least in part, from non-metallic composites. Typically, such structures will include a framework having spars, stringers, and ribs surrounded by a skin or covering. The latter is built up from multiple plies of a high strength, anisotropic tape composed of collocated, unidirectional fibers embedded in a polymeric matrix.

In aerodynamic structures of the character under consideration, a problem arises at the junctures between the center and outboard sections of the structure where its zero axis changes direction. Unlike aluminum or other metal, the plies of the coverings with which I am concerned cannot simply be mechanically butt-spliced together at these junctures and still adequately carry loads around the corner between the adjoining sections. Furthermore, even if they could, that solution would be undesirable because mechanical splices are both heavy and expensive.

SUMMARY OF THE INVENTION

I have now invented and am disclosing herein a novel method of fabricating an aerodynamic structure which solves the problem posed in the preceding paragraph by insuring that the wanted load carrying properties are obtained at the juncture where the zero axis of the structure changes direction as well as elsewhere in the structure.

In general, this is accomplished by fabricating the structure's covering or skin from tapes composed of unidirectional reinforcing fibers or filaments embedded in a polymeric matrix and by laying succeeding layers of tapes so that their filaments are oriented at specific angles with respect to the reinforcements of adjacent layers that make the covering capable of carrying the complicated, non-uniform loads imposed on the structure across the juncture or junctures between its relatively inclined sections. Preferred are those multi ply coverings in which the following reinforcement orientations are utilized: 90°, ±67.5°, ±45°, ±22.5°, and 0°.

One requirement imposed on a composite structure employing the principles of the present invention is that as many of the reinforcing filaments as possible extend in the direction of the major spanwise loads imposed on stabilizer 20. This requirement is satisfied by the array of reinforcing fiber orientations just described.

Also, by laying the plies at these angles in an appropriate sequence, continuity of the covering's load bearing capacity in spanwise and wind directions and in other directions can be obtained, and a high proportion of plies extending from tip-to-tip of the structure can be employed, maximizing the strength-to-weight ratio of the covering.

It is important, in this regard, that at least 10 percent of the reinforcing filaments extend in each of the directions in which they are oriented with respect to the zero axis of the structural sections they cover. Again, this contributes to the ability of the covering to withstand the loads imposed on the structure.

It is also preferred that tapes with carbon fibers or filaments be utilized as filaments of that character have the highest strength-to-weight ratio. The matrix may be any of the epoxy resins currently available for such purposes or a different type of polymer, if desired.

Several advantages of my novel composite aerodynamic structures have been identified above. Another is that skins or coverings employing the principles of the present invention can be readily tailored to a particular structural design with the plies being readily orientable to provide the load-bearing properties needed in each section of the aerodynamic structure being fabricated.

Yet another important advantage of my invention, alluded to above, is that there are no mechanical splices between the sections of the aerodynamic structure. This is important because such splices are both heavy and expensive.

Still another important feature of the present invention is the utilization of tear straps to arrest the propagation of cracks propagated in the skins of the novel aerodynamic structures I have invented. Like the skins themselves, the tear straps are preferably constructed from bonded together plies of anisotropic, polymeric composites reinforced with unidirectional filaments or fibers. These tear straps are oriented with their reinforcing fibers paralleling the zero axes of the sections of the aerodynamic structure in which the tear straps are located. The tear straps spaced chordwise of those structural sections in surmounting relationship to stringers utilized to stiffen the latter.

Typically, the tear straps will be employed in groups of three, two toward the bottom and top of, and integrated with, the structure's skin and the third symmetrical about the centerplane of that skin. One tear strap in each such group of three is centered on the stringer, the other two are offset from the stringer centerline, one to each side.

At the junctures or joints between sections of the structure, the plies making up the tear straps incorporated in the respective sections are overlapped and bonded together to make continuous the crack arresting capability of the tear straps.

Filler plies are preferably located in the spaces between the tear straps to make the surfaces of the skin as smooth and free of irregularities as possible. This promotes desirable aerodynamic characteristics and facilitates the attachment of the covering to its supporting framework.

The filler plies will also typically be a polymeric composite reinforced with unidirectional filaments. The filler plies are preferably so oriented that the reinforcing fibers extend at an angle of 45° relative to the zero axis of the structural section in which they are located. This prevents the filler plies from picking up more than small loads, which minimizes those plies' interference with the load bearing capabilities of the plies making up the structure's skin.

OBJECTS OF THE INVENTION

From the foregoing it will be apparent to the reader that one important and primary object of my invention resides in the provision of novel, improved aerodynamic structures of composite configuration.

Other also important, but more specific, objects of that invention reside in the provision of aerodynamic structures as described in the preceding paragraph:

which have an outboard section joined at an angle to a center section and which are so fabricated as to provide undiminished load bearing capacity across the joint therebetween;

which, in conjunction with the preceding object, avoid the cost and weight penalties associated with splices between the sections of an aerodynamic structure;

which include a framework surrounded by a skin composed of: multiple plies of a fiber reinforced polymeric composite and components that are capable of arresting cracks propagating through said skin;

which, in conjunction with the preceding object, have filler plies between the tear straps to provide level surfaces and thereby promote desirable aerodynamic characteristics and to facilitate the attachment of the skin to the skin-supporting framework of the aerodynamic structure;

which, in conjunction with the preceding object, have filler plies reinforced with unidirectional filaments, those filaments being so oriented as to minimize interference with the load bearing capabilities of the plies making up the skin of the aerodynamic structure;

which are capable of carrying loads around the corner between the outboard and center sections of the structure without mechanically splicing said sections together;

which are fabricated by a technique that is readily adaptable to different designs;

which have a center section and an outboard section extending at an angle therefrom and a skin composed of anisotropic, filament reinforced composite plies, part of those plies extending from tip-to-tip of the structure and the remainder being overlapped at the joint between the center and outboard sections of the structure;

which are designed to accommodate high levels of stress;

which have a skin composed of anisotropic plies of a filament reinforced polymeric composite with those plies being symmetrically arranged with respect to the centerplane of the skin;

which have a skin composed of anisotropic plies of a polymeric composite reinforced with unidirectional filaments, the plies being so oriented relative to each other that the directions in which the filaments extend differ by the same angle or a multiple of that angle;

in which, in conjunction with the preceding object, at least 10 percent of the reinforcing filaments extend in each of the aforesaid directions;

Other important objects and features and additional advantages of my invention will be apparent to the reader from the foregoing and the appended claims and from the ensuing detailed description and discussion of the invention taken in conjunction with the accompanying drawing.

BRIEF DESCRIPTION OF THE DRAWING

In the drawing:

FIG. 2 is a diagram showing the several orientations of the plies in the skin of the stabilizer;

FIG. 3 shows the relationship between FIGS. 3A and 3B which, taken together, constitute a section through the horizontal stabilizer of FIG. 1 taken substantially along line 3—3 of FIGS. 1A and 1B;

FIG. 4 shows in more detail certain tear straps employed in the horizontal stabilizer to halt the propagation of cracks and, specifically, the relation of those tear straps at the juncture between the center and outboard sections of the stabilizer;

FIG. 5 is a section through the stabilizer taken substantially along line 5—5 of FIG. 4; and FIG. 6 is a similar section taken substantially along line 6—6 of FIG. 4.

DETAILED DESCRIPTION OF ONE CURRENTLY PREFERRED EMBODIMENT

Figure 1B:
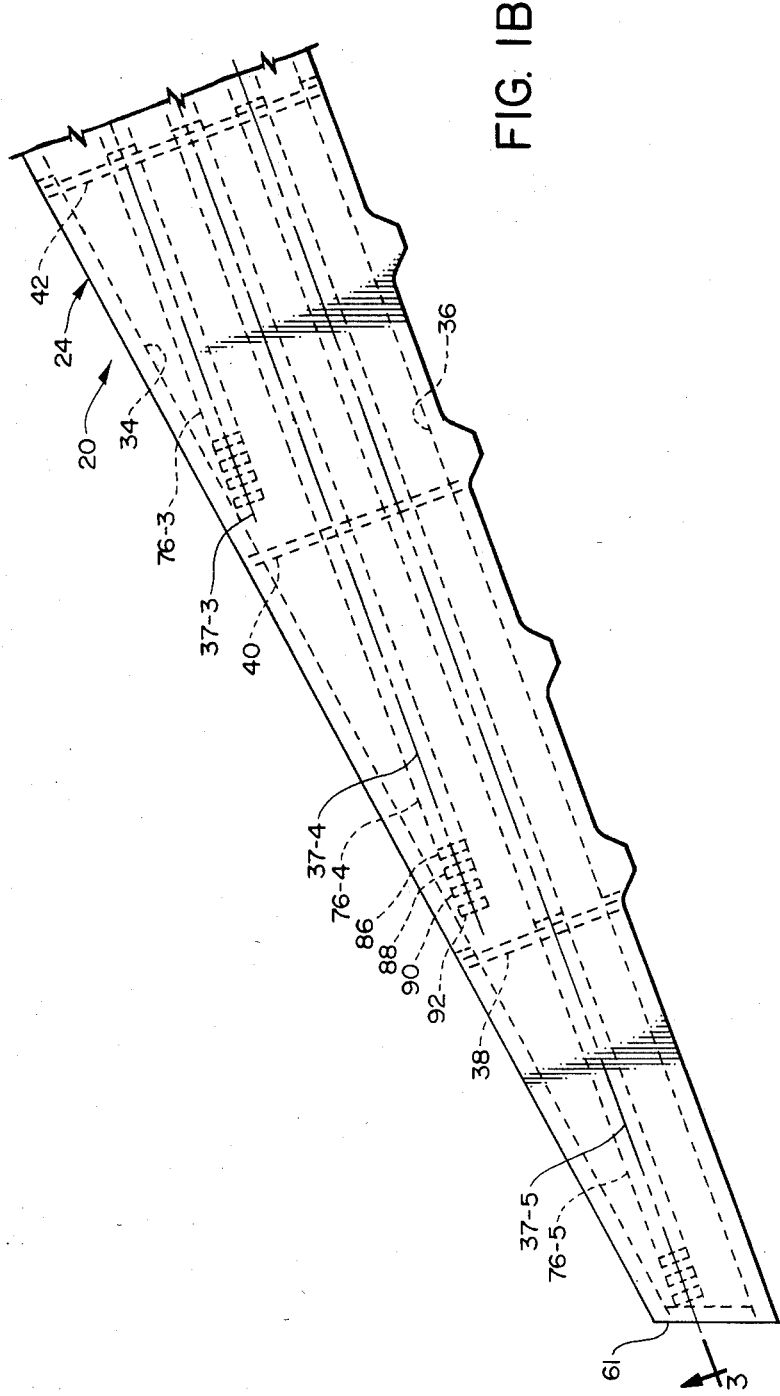
FIG. 1 shows the relationship between FIGS. 1A and 1B which, taken together, constitute a plan view of a horizontal stabilizer constructed of composite materials in accord with the principles of the present invention.

Referring now to the drawing, FIGS. 1A and 1B depict one of two outboard sections and part of the center section of a fixed, horizontal stabilizer 20 of composite construction; that stabilizer embodies the principles of the present invention.

The center section of the stabilizer is identified by reference character 22 and the fore-to-aft centerline of the fuselage to which it is attached by reference character 23. Joined to center section are two sweptback outboard sections with only the left-hand outboard section 24 being shown. The illustrated center and outboard sections 22 and 24 of stabilizer 20 meet at an angle of approximately 150° in a juncture identified by reference character 26 in FIG. 1A. This juncture is coincident with the left-hand side (or body line) of the aircraft fuselage.

Center section 22 of stabilizer 20 includes a framework having front and rear spars 28 and 30. These spars extend lengthwise (i.e., spanwise) of that section.

Also extending in a spanwise direction, and parallel to rear spar 30 (i.e., parallel to the stabilizer's zero axis), are stiffeners or stringers. The centerlines of these stringers, which have been omitted for the sake of clarity, are identified by reference characters 32-1 through 32-5 in FIG. 1A. These stringers are duplicated on the upper and lower sides of center section 22.

Extending in a chordwise direction between front and rear spars 28 and 30 and supporting the upper and lower stringers 32-1 through 32-5 from those spars are airfoil section ribs which have also been omitted for the sake of clarity.

The outboard section 24 of stabilizer 20 has a framework constructed in the same manner as that of the stabilizer's center section 22. The outboard section framework includes front and rear spars 34 and 36, stringers at locations identified by reference characters 37-1 through 37-5 and airfoil section ribs 8, 40, 42, and 44 (only representative ribs are shown).

The frameworks of the stabilizer's center and outboard sections 22 and 24 are covered or surrounded with a skin or covering identified generally by reference character 46 in FIG. 1A.

As discussed above, skin 46 is composed of multiple plies of an anisotropic composite tape which has unidirectional fibers (preferably carbon) embedded in an epoxy or other polymeric matrix. The several plies are oriented to absorb the various loads imposed on stabilizer 20 (primarily those acting in the spanwise direction, which are the major loads) and to carry those loads through the joint 26 between center and outboard stabilizer sections 22 and 24 and through the companion joint (not shown) on the opposite side of the stabilizer.

The orientations of the unidirectional reinforcing filaments or fibers in those plies making up the skin 46 of stabilizer 20 are shown in FIG. 2.

Referring now to FIG. 3, skin 46 is symmetrical with respect to its centerplane 48; that is, the skin has equal numbers of plies of like orientation and the composite construction discussed above on each side of centerplane 48. The skin is made up of two inner sets of plies which extend from tip-to-tip of the stabilizer and two outer sets of plies which span only a single (center or outboard) section of the stabilizer.

The inner groups 50 and 52 include plies 50-1 through 50-4 and 52-1 through 52-4. Plies 50-1-50-4 and 52-1-52-4 extend from tip-to-tip of stabilizer 20.

The two sets of plies 50 and 52 are oriented with their reinforcing filaments at angles of $-22.5°$, $+22.5°$, $-67.5°$, and $+67.5°$ beginning with the innermost ply in each set.

A symmetrical array of plies is used to, among other things, insure that the skin will not warp when it is cured (350° F. is a typical curing temperature).

Overlying the plies just described are two outer sets of plies 54 and 56 composed of plies 54-1-54-5 and 56-1-56-5 which are unique to the center section 22 of the stabilizer and two similar sets of plies 58 and 60 with members 58-1-58-5 and 60-1-60-5 which are unique to the outboard section 24 of the stabilizer.

Beginning with the innermost ply, those in the top set are oriented at angles of 0°, $-45°$, 90°, $+45°$, and $-45°$. The orientations of the unidirectional filaments in the bottom set, again beginning with the innermost, are 0°, $+45°$, 90°, $-45°$, and $+45°$. To carry loads uniformly over the span of stabilizer 20, the plies 58-1-58-5 and 60-1-60-5 in those two sets of plies unique to the outboard section 24 of the stabilizer are laid at angles of $+67.5°$, $-22.5°$, $+67.5°$, $-22.5°$, and $+67.5°$ in the top set of plies and at angles of $-22.5°$, $+67.5°$, $-22.5°$, $+67.5°$, and $-22.5°$ in the bottom set of plies 60-1-60-5. These orientations are duplicated in mirror image fashion in the unshown right-hand stabilizer outboard section.

Referring now to both FIG. 1 and FIG. 3, inner and outer plies 54-1-54-5 and 56-1-56-5 are respectively overlapped with plies 58-1-58-5 and 60-1-60-5 in the vicinity of joint 26. Successive plies in each of the two associated sets 54/58 and 56/60 are dropped off or terminated in a staggered fashion as best shown in FIG. 3 to avoid lumps in covering 46; i.e., to provide as smooth a skin as is possible for the purposes discussed above. The drop-off interval—i.e., the distance between the ends of successive plies—is 0.5 inch in the exemplary stabilizer illustrated in the drawing.

It is also to be noted (see FIG. 1a) that the drop-offs of both the center section plies and the outboard section plies are preferably parallel to the juncture 26 between those sections from front spar 28 to about stringer 37-3 and that the drop-offs then extend at angle of approximately 165° from that location to the rear of the stabilizer.

Also, as is shown in FIG. 3, successive outboard section plies 60-2-60-5 and 58-2-58-5 do not extend completely to the tip of the stabilizer but are successively dropped off or terminated at stations which are increasingly closer to the center of stabilizer 20 from tip 61. As a consequence, the skin 46 of the stabilizer is thinner toward the tip of the stabilizer where the loads imposed on the skin are lower and thicker toward the juncture 26 between the outboard and center sections where the loads are higher and must be carried around a corner and where holes for stabilizer-to-fuselage attachments must be made in the stabilizer.

In the illustrated stabilizer, the distance between the ends of these successively dropped off plies in the outer and inner sets thereof is 40 inches.

Referring now to FIGS. 1 and 3-6, tear straps are incorporated in skin 46 to limit the propagation of cracks through the several plies of the skin as was discussed above.

Tear straps are arranged in groups of three over (and under) each of the stringers 32-1-32-5 in the center section 22 of stabilizer 20 and above and below the stringers 37-1-37-5 in the outboard section 24 of the stabilizer. These tear straps extend parallel to the stringers.

Similar three-membered groups of tear straps extending parallel to the longitudinal axes of center section and outboard section front and rear spars 28, 30, 34, and 36 are incorporated in skin 46 above and below those spars.

One example of the tear strap arrangement is the group 62 of tear straps overlying stringer 32-5 in that part of skin 46 covering the center section 22 of the stabilizer. Tear strap group 62 includes one tear strap 64 between the inner group 56 of center section plies and tip-to-tip group of plies 52, a second tear strap 66 between the two tip-to-tip groups of plies 52 and 50, and a third tear strap 68 between the latter group and the outermost group 54 of plies covering the center section of the stabilizer.

Similarly, there is incorporated in that part of skin 46 covering the outboard section 24 of the stabilizer an exemplary group 70 of three tear straps 72, 74, and 76. These are respectively located between: (1) the innermost group of plies 60 unique to the outboard section of the stabilizer and the tip-to-tip group of plies 52, (2) the two groups of tip-to-tip plies 52 and 50, and (3) the latter and that outermost group of plies 58 which is also unique to the outboard section 24 of the stabilizer.

Typically, one of the tear straps in each of the tear strap groups is disposed symmetrically with respect to the longitudinal centerline of the associated stringer. The other two tear straps will, equally typically, be staggered to the opposite sides of that centerline. In one exemplary stabilizer design embodying the principles of the present invention, this stagger is 0.12 inch.

The groups of three tear straps over the stabilizer's front and rear spars 28 and 30 (and 34 and 36) are like those just described except that the tear straps are either centered on the spar or offset from the spar centerline toward the middle of the stabilizer.

As suggested by FIG. 5, each of the tear straps incorporated in skin 46 is of multi- (four) ply construction. As in the skin itself, these plies are a polymeric composite reinforced with unidirectional fibers or filaments.

Two exemplary tear straps 68 and 76, respectively incorporated in the center and outboard sections of the stabilizer's covering, are shown in FIG. 5.

Tear strap 68 is fabricated from four bonded together plies 78, 80, 82, and 84 all oriented with their reinforcing filaments paralleling the longitudinal axis 30-5 of the rearmost stringer in the center section 22 of the stabilizer.

Similarly, tear strap 76 is fabricated from bonded together plies 86, 88, 90, and 92 oriented with their reinforcing fibers paralleling the longitudinal axis 36-5 of the rearmost stringer in the outboard section of the stabilizer.

As is shown in FIG. 4, and in more detail in FIG. 5, the four plies of the center section tear strap 68 overlap, and are bonded to, the plies in the outboard section tear strap 76 in the area of the juncture 26 between the center and outboard sections of the wing. The ends of the plies making up these two tear straps are terminated or dropped off in a staggered fashion, shown in FIG. 5 and at intervals of 1.0 inch, to minimize irregularities such as bumps in skin or covering 46.

The other mating center section and outboard section tear straps are similarly fabricated and overlapped. For the most part, they have not been shown in any detail herein as to do so would simply be redundant.

Like the outer groups of skin-forming plies 58 and 60, successive plies of the outer and inner tear straps in each group of three are terminated or dropped off at different locations along the stabilizer's outboard section 24, these tear straps thereby being stepped down in thickness from four plies at the inner end of the section to two plies toward the tip 61 of the stabilizer as shown in FIG. 3B. This reduces the weight of the skin while matching the crack-arresting capabilities the tear straps to the lessened requirements that need be met as the skin becomes increasingly thinner toward the stabilizer tip.

Referring now to FIGS. 4 and 6, there are gaps between the tear straps associated with successive stringers such as those center section stringers 32-2 and 32-3 and outboard section stringers 37-2 and 37-3 shown in FIG. 4 (the tear straps are 3.0 inches wide in the illustrated stabilizer 20). These gaps, 94 and 96, are preferably filled with filler plies to minimize irregularities in the thickness of skin of covering 46.

As in the cases of the tear straps and the skin itself, plies of an anisotropic, polymeric composite reinforced with unidirectional fibers are preferably employed as fillers. To match the thickness of the tear straps between which they are located, groups of four filler plies are used. FIG. 6, as an example, shows the group 97 of four center section filler plies 98, 100, 102, and 104 located between tear straps 68-2 and 68-3 in the covering over the center section 22 of stabilizer 20 and the group 105 of four filler plies 106, 108, 110, and 112 disposed between those tear straps 76-2 and 76-3 incorporated in skin 46 over the outboard section 24 of the stabilizer.

As discussed above, the filler plies are oriented at angles of ±45° relative to the zero axis of the stabilizer outboard section where they are employed so that those plies will act only as fillers and not pick up more than a small part of the loads carried by skin 46.

Like the tear straps, the center section filler plies 98, 100, 102, and 104 are respectively overlapped with the outboard section filler plies 106, 108, 110, and 112 at the juncture 26 between the center and outboard sections of the stabilizer. Successive plies in the center section and outboard section sets are dropped off or terminated in staggered fashion, again to minimize irregularities in the thickness of covering 46.

Filler plies are employed only in the center section of the wing and those inner parts of the outboard section where the tear straps are thickest and where there would consequently be irregularities or ramps of an unacceptable magnitude absent the fillers. Further along the outboard section where the tear straps are thinner, the filler plies can be omitted with an appreciable weight savings and reduction in manufacturing cost without creating irregularities of any significant magnitude in the surface of the stabilizer's skin.

Various composites can of course be employed in the fabrication of skins or coverings of the character described above. As mentioned on more than one occasion above, epoxy resins reinforced with carbon filaments or fibers are preferred because of the high tensile strength possessed by the latter. A typical ply of this character will have a cured thickness of 0.0056 inch.

The exemplary skin 46 shown in the drawing ranges in thickness from 0.056 inch at the tip 61 of stabilizer 20 where the loads imposed on the covering are the lowest to 0.24 inch at the juncture between the center and outboard sections of the stabilizer, in part because of the doubling of the skin, tear strap, and filler plies in that area. This increase in thickness provides the strength needed to smoothly transfer loads around the corners between the center section 22 of the stabilizer and its two outboard sections. Also, the increased number of plies in the vicinity of the junctures between the center and outboard sections compensates for the loss of strength engendered in forming holes in covering 46 for the attachments used in securing the stabilizer to the fuselage of the aircraft in which the stabilizer is incorporated.

As was mentioned above, only the juncture 26 between the center section 22 of stabilizer 20 and its left-hand outboard section 24 has been shown in the drawing in the interest of brevity. The juncture between the right-hand outboard section and center section 22 is a mirror image of juncture 26 except that the orientation of the outboard section plies are reversed in that the orientation of −22.5° ply 60-5 in the left-hand outboard section 24 becomes +67.5° in the right-hand outboard section, the orientation of +67.5° ply 60-4 in the left-hand outboard section becomes −22.5° in the right-hand outboard section, and so on.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed as my invention is:

1. An aerodynamic structure of composite construction having a center section and an outboard section joined at an angle to said center section, said aerodynamic structure including: (a) a framework which has longitudinally extending spars at the leading and trailing edges thereof and ribs of airfoil section extending between, oriented transversely relative to, and supported by said spars; and (b) a skin composed of a quasi-isotropic layout of superimposed, bonded together, flat, anisotropic plies of a filament reinforced polymeric composite surrounding and supported by said framework.

2. An aerodynamic structure of composite construction as defined in claim 1 wherein the plies on opposite sides of the transverse centerplane through said skin are so angled relative to each other as to provide symmetrical arrays of plies on said opposite sides of said centerplane.

3. An aerodynamic structure of composite construction having a center section and an outboard section joined at an angle to said center section, said aerodynamic structure including: a framework and a skin composed of bonded together plies of a filament reinforced polymeric composite surrounding and supported by said framework, said skin comprising a combination of: (a) plies which extend from tip-to-tip of said aerodynamic structure and (b) plies which are generally confined to said center and outboard sections of the aerodynamic structure and are overlapped in that area bounding the juncture between said center and outboard sections.

4. An aerodynamic structure of composite construction as defined in claim 3 wherein those plies which extend from end-to-end of the structure have filaments which are oriented at angles of ±22.5 and ±67.5 degrees relative to the zero axis of said structure's center section.

5. An aerodynamic structure of composite construction having a center section and an outboard section joined at an angle to said center section, said aerodynamic structure including: a framework and a skin composed of bonded together plies of a filament reinforced polymeric composite surrounding and supported by said framework, said skin having four superimposed groups of plies, said plies all having unidirectional filaments and said plies being oriented from top-to-bottom of said skin with said unidirectional fibers extending at the following angles with respect to the zero axis of the structure:

| Center Section Section Plies | Degrees Tip-to-Tip Plies | Outboard Plies |
| --- | --- | --- |
| −45 |  | +67.5 |
| +45 |  | −22.5 |
| 90 |  | +67.5 |
| −45 |  | −22.5 |
| 0 |  | +67.5 |
|  | +67.5 |  |
|  | −67.5 |  |
|  | −22.5 |  |
|  | +22.5 |  |
|  | −67.5 |  |
|  | +67.5 |  |
| 0 |  | −22.5 |
| +45 |  | +67.5 |
| 90 |  | −22.5 |
| −45 |  | +67.5 |
| +45 |  | −22.5 |

6. An aerodynamic structure of composite construction as defined in claim 5 wherein those plies having fibers oriented at angles of ±22.5 and ±67.5 degrees relative to said center section zero axis extend from tip-to-tip of said structure.

7. An aerodynamic structure of composite construction as defined in claim 5 wherein, in those two outer groups of plies covering the framework of the structure's outboard section, successive plies are dropped off at stations which are increasingly closer to the juncture between said outboard section and said center section of the structure.

8. An aerodynamic structure of composite construction as defined in claim 5 wherein at least 10 percent of the fibers in said skin are oriented in each of the aforesaid directions.

9. An aerodynamic structure of composite construction as defined in claim 5 wherein the plies in those outer groups covering the outboard section of the structure are overlapped with and bonded to the plies of those outer groups overlying the center section of the structure, those overlapping ends of successive plies in the aforesaid groups being dropped off in a staggered fashion in the vicinity of the juncture between the structure's center and outboard sections.

10. An aerodynamic structure of composite construction having a center section and an outboard section joined at an angle to said center section, said aerodynamic structure including: a framework and a skin composed of bonded together plies of a filament reinforced, polymeric composite surrounding and supported by said framework, said skin including tear straps for inhibiting the propagation of cracks in said skin, said tear straps being: integrated into said skin, extending lengthwise of said center section and said outboard section at locations spaced chordwise of said center and outboard sections, and comprised of bonded together anisotropic plies of a filament reinforced polymeric composite.

11. An aerodynamic structure of composite construction as defined in claim 10 wherein said tear straps extend parallel to either the zero axis of the structure's outboard section or the zero axis of the structure's center section.

12. An aerodynamic structure of composite construction as defined in claim 10 wherein the plies of which the tear straps are fabricated are reinforced with unidirectional fibers and wherein said fibers extend parallel to the zero axis of that section of the aerodynamic structure in which they are incorporated.

13. An aerodynamic structure of composite construction as defined in claim 10 wherein the plies of said center section and outboard section tear straps are overlapped and bonded together in that area of the aerodynamic structure in which the outboard section is joined to said center section.

14. An aerodynamic structure of composite construction as defined in claim 10 wherein successive plies in each of said tear straps are dropped off at stations closer to the joint between the center section and the outboard section of the aerodynamic structure.

15. An aerodynamic structure of composite construction as defined in claim 10 wherein said tear straps are employed in groups of three superimposed straps and wherein successive plies in the two outermost straps of those groups in the outboard section of the structure are dropped off at stations which are progressively closer to the inner end of the outboard section.

16. An aerodynamic structure of composite construction as defined in claim 10 which has filler plies in the spaces between the tear straps in those areas of the skin in which said tear straps overlap, said filler plies being integrated into said skin to minimize irregularities in the exposed surfaces of said skin.

17. An aerodynamic structure as defined in claim 16 in which said filler plies have unidirectional reinforcing filaments and in which said filaments are oriented at angles of about ±45° relative to the zero axis of the section of the aerodynamic structure in which they are incorporated to minimize interference with the load absorbing capabilities of those plies making up the skin of the aerodynamic structure.

18. An aerodynamic structure as defined in claim 10 which has stringers spaced in the chordwise direction in said center section and said outboard section and a group of tear straps overlying each of said stringers, the tear straps in each of said groups being embedded at different depths in said skin, a first of said tear straps being symmetrical relative to the zero axis of the stringer it overlies, and a second and a third of the tear straps in each of said groups being so integrated into the skin of the aerodynamic structure that the longitudinal axes of those tear straps are respectively forward and aft of the zero axis of the stringer under said second and third tear straps.

* * * * *